Figure 1:
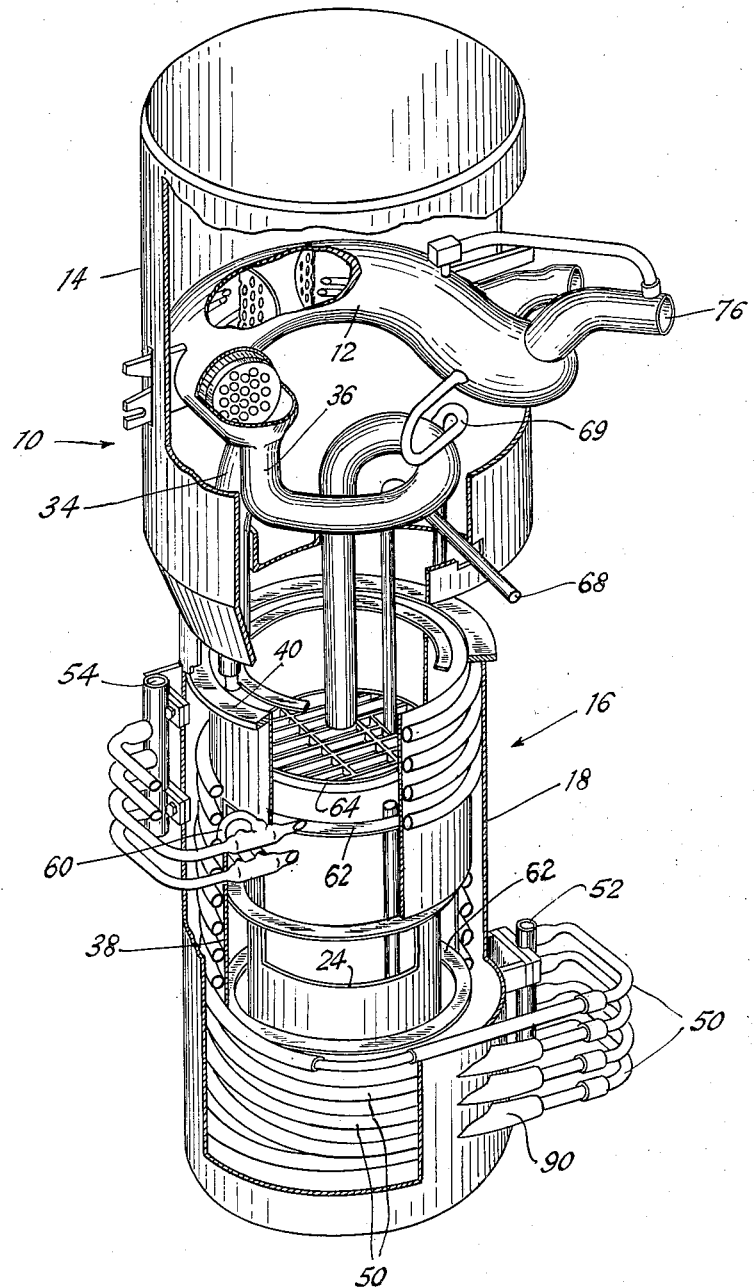

Jan. 31, 1961  R. T. SCHOMER  2,969,970
LIQUID METAL PURIFIER
Filed June 4, 1956  3 Sheets-Sheet 1

INVENTOR.
BY Robert T. Schomer
ATTORNEY

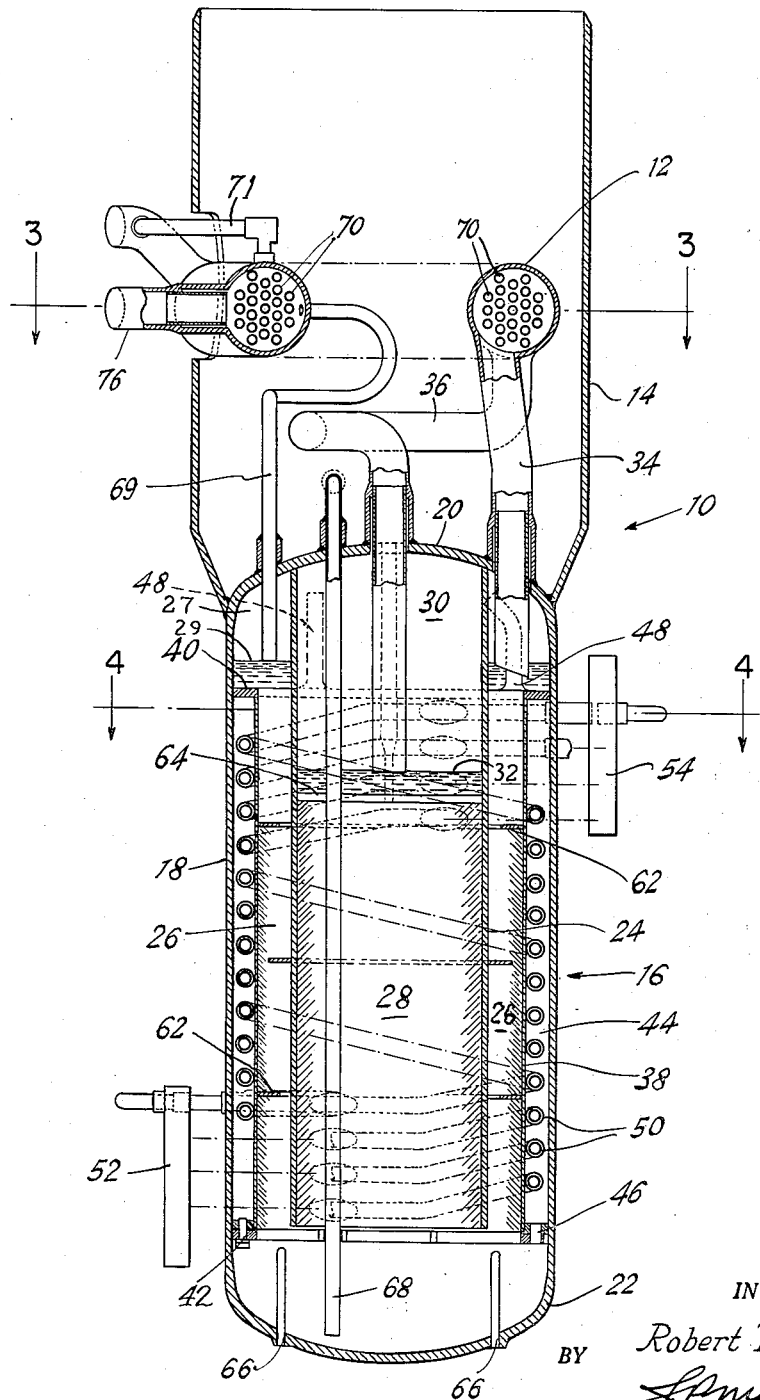

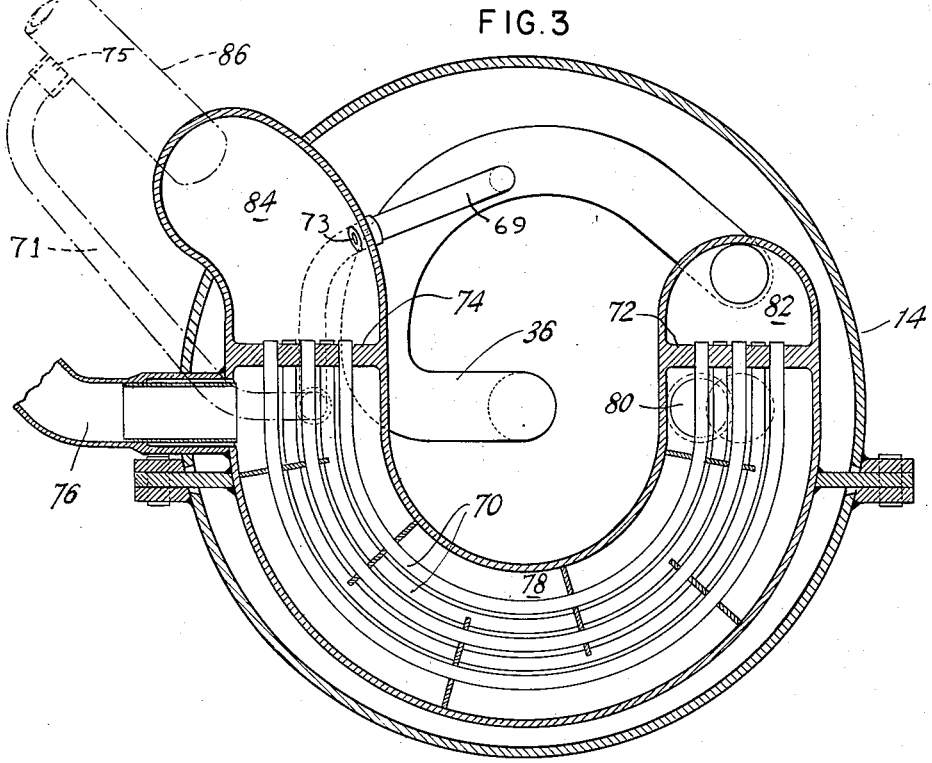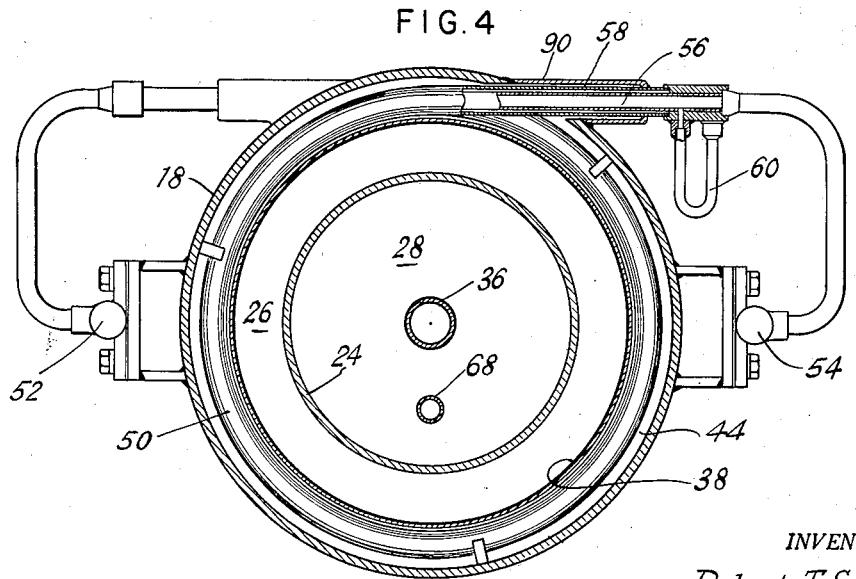

United States Patent Office 2,969,970
Patented Jan. 31, 1961

2,969,970

LIQUID METAL PURIFIER

Robert T. Schomer, Baldwin, N.Y., assignor to The Babcock & Wilcox Company, New York, N.Y., a corporation of New Jersey Filed June 4, 1956, Ser. No. 589,210

3 Claims. (Cl. 266—37)

This invention relates in general to a liquid metal purifier apparatus and more particularly, to an apparatus for removing the oxides from a liquid metal.

In the operation of some of the modern day processes, wherein liquid metal is used as a heat transfer medium, it is necessary to maintain the liquid metal relatively pure by the reomval of metal oxides. These metal oxides result from the infiltration of oxygen into the system and the oxide dissolves in the liquid metal. Typical liquid metals which are in use are sodium, potassium, lithium, mercury, lead and alloys and eutectics of such metals. It is known that the solubility of oxides in such liquid metals is a direct function of temperature. Therefore, purifiers for removing such oxides lower the temperature of the liquid metal to a point just above the freezing temperature and then remove by precipitation and entrapment the oxides which come out of solution.

It is the characteristic of liquid metal that it is highly conductive for the transmission of heat. It is also known that high nickel and chromium and stainless steels are the metals most suitable for the containment of the liquid metal. These stainless steels are austenitic and have a relatively low thermal conductivity. Accordingly, when you place the high thermal conductive liquid in a pressure vessel made of austenitic material, the pressure vessel becomes subject to very sharp temperature gradients and resulting high thermally induced stresses. These stresses are subject to rapid change or reversal and with time lead to structural deterioration.

The present invention provides apparatus for purifying liquid metal in which a vertically elongated pressure vessel is arranged with a peripherally quiescent liquid metal chamber which is cooled to result in the cooling of liquid metal flowing through the vessel. The cooling of the liquid metal precipitates the oxides and means are provided within the vessel for entrapping the oxide so precipitated.

The invention also provides a liquid metal purifier in which large liquid metal temperature gradients are experienced without subjecting the pressure parts of the purifier to severe temperature stresses.

The various features of novelty which characterize the invention are pointed out with particularity in the claims annexed to and forming a part of this specification, but for a better understanding of the invention, its operating advantages and specific objects attained by its use, reference should be had to the accompanying drawings and descriptive matter in which there is illustrated and described preferred embodiments of the invention.

In the drawings:

Fig. 1 is an isometric drawing of the invention;
Fig. 2 is a vertical section through the purifier of Fig. 1;
Fig. 3 is a horizontal section along the line 3—3 of Fig. 2; and
Fig. 4 is a horizontal section taken along the lines 4—4 of Fig. 2.

The purifier 10 consists of an upper U-shaped shell and tube type regenerative heat exchanger 12 supported in a skirt 14 which is attached to a lower pressure vessel 16 for purifying. The purifying vessel comprising a cylindrical side wall 18, an upper dished head 20 and a lower dished head 22. The interior of the vessel is longitudinally divided by a cylindrically shaped baffle 24 into an outer annular shaped down-flowing pass 26 and an inner up-flowing pass 28. The upper portion of the vessel adjacent the dished head 20 is arranged to have a gas space 27 above a liquid level 29 in the downflow pass 26 and a gas space 30 above a liquid level 32 in the upflow pass 28. A liquid metal inlet pipe 34 is arranged to connect the shell side of the heat exchanger 12 with the downflowing pass 26 and an outlet pipe 36 is arranged to take the upflowing liquid metal from the upflowing pass 28 and introduce it to the tube side of the heat exchanger 12.

Within the vessel 16 there is a longitudinally disposed cylindrical baffle 38 arranged adjacent but spaced from the wall 18 of the shell and which forms in conjunction with a top plate 40 and a bottom plate 42 an annular shaped quiescent liquid metal chamber 44. The quiescent liquid metal chamber 44 is in communication with the liquid metal within the shell through a plurality of circulation openings 46 in the lower plate 42, and in the top of the quiescent chamber are a number of vents 48 arranged to vent any collected gas into the gas space 29 within the shell. Within the quiescent chamber 44 there are a plurality of heat exchange tubes vertically spaced to cool the quiescent liquid metal within the chamber and thus cool the baffle 38. As arranged in this embodiment, the cooling tubes are four interwound helical double tubes 50 which are connected to an inlet header 52 external of the shell and which pass through the shell into the chamber 44. Therein they wind three and one half times and pass out of the pressure shell into an outlet header 54. Each of these double tubes has an inner tube 56 concentrically placed within an outer tube 58. In the annular space, between the tubes there is a third fluid which is non-reactive with either liquid metal or water, such as nitrogen, to maintain thermal conductivity from the inner tube to the liquid metal and to detect leakage from either the inner tube to the annular space or from the liquid metal to the annular space. All of the third fluid annular passages are interconnected by the cross-over pieces 60.

The cooled quiescent liquid metal in the chamber 44 cools the baffle 38 to present a cold surface longitudinally of the downflow pass 26 such that the liquid metal flowing therein will be cooled to a temperature just above its fusion point and during which passage the oxides of the metal will precipitate. To catch the oxides there is disposed woven wire mesh filtering means (shown in passes 26, 28 as partially hatched) in the downflowing pass which are secured by the retaining rings 62. The metal oxides will be entrapped by and deposited on the wire mesh filter. As the liquid metal flows up through the up pass 28, it is further cleaned by other wire mesh filtering means which is retained therein by the central retainer 64.

Thermocouple wells 66 are located in the bottom dished head 22 so that the temperature of the liquid flowing metal may be continuously measured. Also, a drain 68 is arranged to take liquid metal from the shell and pass it out through the upper head when a suction is placed thereon. A vent 69 takes gas from the gas space 29 and vents it back up through the shell of the heat exchanger 12 and via line 71 into the flowing liquid metal line 86 at any time necessary, such as during the filling of the purifier. Each vent line 69 and 71 has an orifice 73 and 75 respectively to limit the quantity of liquid metal which may bypass the purifier.

The U-shaped heat exchanger 12 (Fig. 3) has U- shaped tubes 70 connected between an inlet tube sheet 72 and an outlet tube sheet 74 for the flow of liquid metal therethrough. The incoming liquid metal from the liquid metal source (not shown) passes through an inlet pipe 76 into the shell side 78 of the heat exchanger and passes out through the outlet 80 into the pipe 34 where it enters the purifier vessel 16. The outlet pipe 36 from the purifier section delivers liquid metal into an inlet chamber 82 wherein the liquid metal flows through the tubes to the outlet chamber 84. During this passage the cool liquid metal is heated up by the incoming hot liquid metal flowing in the shell side. The reheated metal then passes to an outlet 86 back to the source.

At each of the connections opening into the interior of the pressure shell, there is a thermal sleeve arrangement. A typical example is shown in Fig. 4 where the double tube passes through the wall 18. There is an outer tubular member 90 which is welded to the longitudinal shell 18 and in turn is welded to the outer tube 58. The purpose of this thermal sleeve is to reduce the temperature gradient or the degrees of temperature per inch at a connection to the pressure shell and thus avoid high induced stresses in the metal due to restrained differential thermal expansions. It can be seen that all openings in the purifying apparatus use such connections, for example, the liquid metal pipe 34, outlet pipe 36, drain 68, and vent 69.

The quiescent liquid metal chamber 44 is thus arranged so that the cooling fluid flowing within the tubes 50 will not subject the structural apparatus to severe temperature gradients. This is accomplished by immersing the cooling fluid in quiescent liquid metal. The heat from the hot liquid metal flowing down the downpass 26 progressively passes through the baffle 38, a thickness of liquid metal and then the double tube walls. Thus these thermal resistances cause the temperature change per inch to be relatively low and the resulting thermal stress is low. Further, by this arrangement the entire longitudinal surface of the baffle 38 is low in temperature and this increases the effectiveness of the surface for cooling the downflowing liquid, while causing the high temperature gradients to be across structural members that are not pressure carrying members. By this expedient the required relatively large temperature gradients can be carried in the purifier without the imposition of stresses on the pressure members.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:
1. A liquid metal purifier comprising a vertically elongated vessel, baffle means longitudinally dividing said vessel into an inner up-flow pass and a communicating outer enveloping down-flow pass, a liquid metal inlet opening into said down-flow pass, a liquid metal outlet opening from said up-flow pass, the invention comprising means forming a peripheral quiescent liquid metal chamber extending along the inside wall of the vessel within and in communication with said down pass, and means cooling the quiescent liquid metal in said chamber to present a cold wall to the flowing liquid metal and precipitate the metal oxides therefrom.

2. A liquid metal purifier comprising a vertically elongated vessel, baffle means longitudinally dividing said vessel into an inner up-flow pass and a communicating outer enveloping down-flow pass, a liquid metal inlet opening into said down-flow pass, a liquid metal outlet opening from said up-flow pass, the invention comprising means forming a peripheral quiescent liquid metal chamber extending along the inside wall of the vessel within and in communication with said down pass, means cooling the quiescent liquid metal in said chamber to present a cold wall to the flowing liquid metal and precipitate the metal oxides therefrom, said cooling means including a plurality of double tubes vertically spaced within said quiescent liquid metal chamber, means for flowing a cooling liquid within the inner tube, means for filling the annular space between the inner tube and outer tube with a thermal conducting fluid which is less chemically reacting with the liquid metal than said cooling fluid, and filtering means arranged in said flow passes to trap and retain said liquid metal oxides.

3. A liquid metal purifier comprising an elongated vessel, inlet and outlet means for flowing liquid metal therethrough, the invention comprising means in conjunction with said vessel forming a peripheral chamber extending along the inside wall of said vessel adapted to hold relatively quiescent liquid metal and in communication with the liquid metal flowing in the vessel, and heat transfer means for cooling the quiescent liquid whereby said quiescent liquid is in indirect heat transfer relationship with said flowing liquid metal to precipitate the oxides therefrom, said heat transfer means including cooling tubes immersed within the quiescent liquid metal in said peripheral chamber.

References Cited in the file of this patent
UNITED STATES PATENTS

| | | |
|---|---|---|
| 2,006,299 | Kaestner | June 25, 1935 |
| 2,032,602 | Stearns | Mar. 3, 1936 |
| 2,446,054 | McCullough | July 27, 1948 |
| 2,564,337 | Maddex | Aug. 14, 1951 |
| 2,668,047 | Robson et al. | Feb. 2, 1954 |
| 2,745,552 | Bruggeman | May 15, 1956 |
| 2,758,023 | Bareis | Aug. 7, 1956 |

FOREIGN PATENTS

| | | |
|---|---|---|
| 703,081 | Great Britain | Jan. 27, 1954 |
| 748,264 | Great Britain | Apr. 25, 1956 |